United States Patent
Kim et al.

(10) Patent No.: US 12,492,095 B2
(45) Date of Patent: Dec. 9, 2025

(54) APPARATUS FOR MANUFACTURING ELECTRODE ASSEMBLY, ELECTRODE ASSEMBLY MANUFACTURED THERETHROUGH, AND SECONDARY BATTERY

(71) Applicant: LG ENERGY SOLUTION, LTD., Seoul (KR)

(72) Inventors: Woong Ki Kim, Daejeon (KR); Sang Don Lee, Daejeon (KR); Sang Uk Yeo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 621 days.

(21) Appl. No.: 17/782,543

(22) PCT Filed: Dec. 2, 2020

(86) PCT No.: PCT/KR2020/017446
§ 371 (c)(1),
(2) Date: Jun. 3, 2022

(87) PCT Pub. No.: WO2021/112551
PCT Pub. Date: Jun. 10, 2021

(65) Prior Publication Data
US 2023/0002183 A1    Jan. 5, 2023

(30) Foreign Application Priority Data

Dec. 6, 2019 (KR) .......................... 10-2019-0161928

(51) Int. Cl.
*B65H 35/00* (2006.01)
*H01M 10/04* (2006.01)

(52) U.S. Cl.
CPC ........ *B65H 35/0086* (2013.01); *H01M 10/04* (2013.01)

(58) Field of Classification Search
None
See application file for complete search history.

(56) References Cited

U.S. PATENT DOCUMENTS

2014/0020240 A1    1/2014 Watanabe et al.

FOREIGN PATENT DOCUMENTS

| CN | 103460450 A | 12/2013 |
|---|---|---|
| CN | 109585898 A | 4/2019 |

(Continued)

OTHER PUBLICATIONS

English translation for JP2010207936 (Year: 2010).*

(Continued)

*Primary Examiner* — Ryan S Cannon
*Assistant Examiner* — Karen J. Armstrong
(74) *Attorney, Agent, or Firm* — Birch, Stewart, Kolasch & Birch, LLP

(57) ABSTRACT

Disclosed is an apparatus for manufacturing an electrode assembly, an electrode assembly manufactured therethrough, and a secondary battery. The apparatus for manufacturing the electrode assembly according to the present invention includes a cutting part for cutting an electrode to a predetermined size, a supply part disposed in front of the cutting part with respect to a traveling direction of the electrode to move and supply the electrode to the cutting part, and a moving part disposed behind the cutting part with respect to the traveling direction of the electrode to move the electrode cut through the cutting part, the moving part includes a moving suction belt for vacuum-suctioning and moving the electrode, and the moving suction belt fixes an end of the electrode when the electrode is cut in the cutting part.

12 Claims, 7 Drawing Sheets

(56) References Cited

FOREIGN PATENT DOCUMENTS

| EP | 2 696 400 A1 | 2/2014 |
|---|---|---|
| JP | 2010-207936 A | 9/2010 |
| JP | 2012-218785 A | 11/2012 |
| JP | 2017-103004 A | 6/2017 |
| JP | 2017-111864 A | 6/2017 |
| JP | 2017-123321 A | 7/2017 |
| JP | 2018-73659 A | 5/2018 |
| JP | 2018-81786 A | 5/2018 |
| JP | 2019-194953 A | 11/2019 |
| KR | 10-2012-0071653 A | 7/2012 |
| KR | 10-2014-0002019 A | 1/2014 |
| KR | 10-2014-0009015 A | 1/2014 |
| KR | 10-2014-0015647 A | 2/2014 |
| KR | 10-2015-0103904 A | 9/2015 |
| KR | 10-1575152 B1 | 12/2015 |
| KR | 10-2018-0068171 A | 6/2018 |
| KR | 10-1933550 B1 | 12/2018 |
| KR | 10-1956763 B1 | 3/2019 |
| KR | 10-1959082 B1 | 3/2019 |
| KR | 10-2019-0124544 A | 11/2019 |

OTHER PUBLICATIONS

English translation for JP2017111864 (Year: 2017).*
Extended European Search Report for European Application No. 20895341.4, dated Dec. 7, 2022.
International Search Report for PCT/KR2020/017446 (PCT/ISA/210) mailed on Mar. 22, 2021.

* cited by examiner

APPARATUS FOR MANUFACTURING ELECTRODE ASSEMBLY, ELECTRODE ASSEMBLY MANUFACTURED THERETHROUGH, AND SECONDARY BATTERY

CROSS-REFERENCE TO RELATED APPLICATION

The present application claims the benefit of the priority of Korean Patent Application No. 10-2019-0161928, filed on Dec. 6, 2019, which is hereby incorporated by reference in its entirety.

TECHNICAL FIELD

The present invention relates to an apparatus for manufacturing an electrode assembly, an electrode manufactured therethrough, and a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

When the electrode assembly according to the related art is manufactured, after the electrode is moved to the cutting part, the cut electrode and the separator are alternately stacked to manufacture the electrode assembly.

Here, when a gripper holds the electrode to be cut, tension of the electrode may not be secured to cause twisting of the electrode. In addition, there has been a problem in that the electrode is warped due to resistance even when the twisted electrode is put in a nip roll.

Also, even when the gripper holds the electrode, there has been a problem that the twisting occurs due to an electrode swell and a gap of the gripper.

PRIOR ART DOCUMENT

Patent Document

Korean Patent Publication No. 10-2014-0015647

DISCLOSURE OF THE INVENTION

Technical Problem

One aspect of the present invention is to provide an apparatus for manufacturing an electrode assembly, which is capable of preventing an electrode from being twisted when the electrode is moved while and after cutting the electrode, an electrode assembly manufactured through the apparatus, and a secondary battery.

Technical Solution

An apparatus for manufacturing an electrode assembly according to an embodiment of the present invention comprises a cutting part configured to cut an electrode to a predetermined size, a supply part disposed in front of the cutting part with respect to a traveling direction of the electrode to move and supply the electrode to the cutting part, and a moving part disposed behind the cutting part with respect to the traveling direction of the electrode to move the electrode cut through the cutting part, wherein the moving part comprises a moving suction belt configured to vacuum-suction and move the electrode, and the moving suction belt fixes an end of the electrode when the electrode is cut in the cutting part.

An electrode assembly according to an embodiment of the present invention may be an electrode assembly manufactured through the apparatus for manufacturing the electrode assembly.

A secondary battery according to an embodiment of the present invention may be a secondary battery comprising the electrode assembly manufactured through the apparatus for manufacturing the electrode assembly.

Advantageous Effects

According to the present invention, when the electrode is vacuum-suctioned onto the moving part so as to be cut, the electrode may be fixed to be prevented from being twisted. Thereafter, when the electrode cut in the moving part is vacuum-suctioned and moved, the electrode may be prevented from being twisted during the movement.

In addition, when the electrode is cut, the electrode may be vacuum-suctioned onto the supply part and the moving part to firmly fix the electrode, thereby preventing the electrode from being twisted.

Furthermore, when the electrode is cut, and then is moved after being cut, the moving speed of the moving part may be quicker than the moving speed of the supply part that moves the electrode to the cutting part to maintain and improve the tension of the electrode. Therefore, the twisting of the electrode may be more effectively prevented.

MODE FOR CARRYING OUT THE INVENTION

Figure 1:
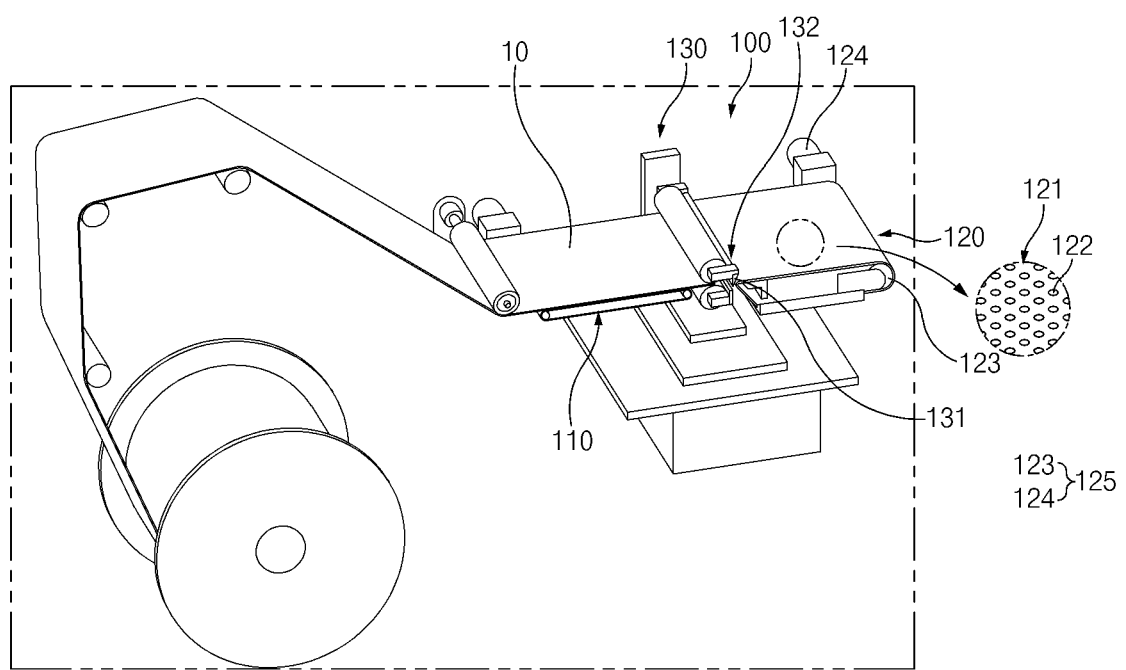
FIG. 1 is a perspective view illustrating an apparatus for manufacturing an electrode assembly according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

One Embodiment

Figure 2:
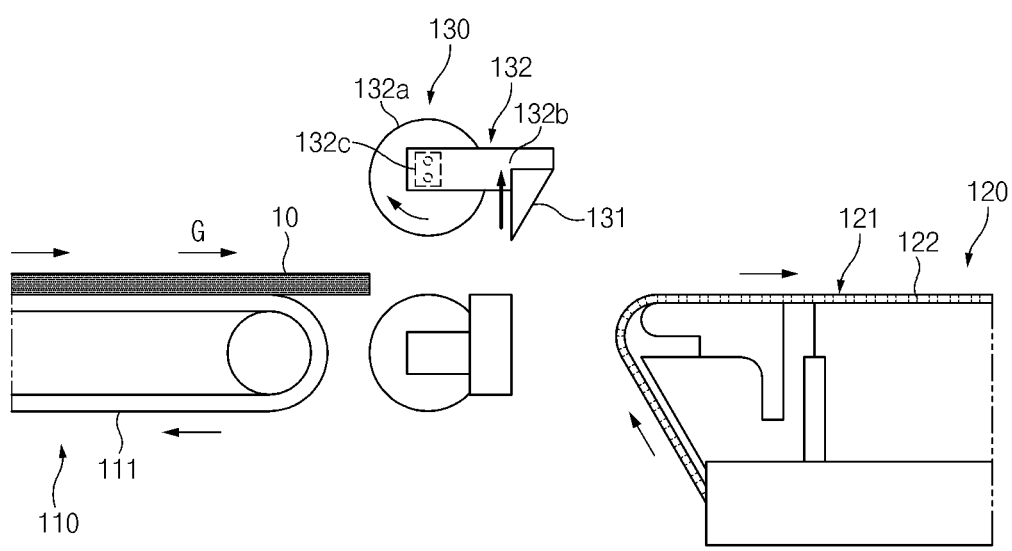
FIG. 2 is a front view illustrating a state before an electrode is cut in the apparatus for manufacturing the electrode assembly according to an embodiment of the present invention.
Figure 3:
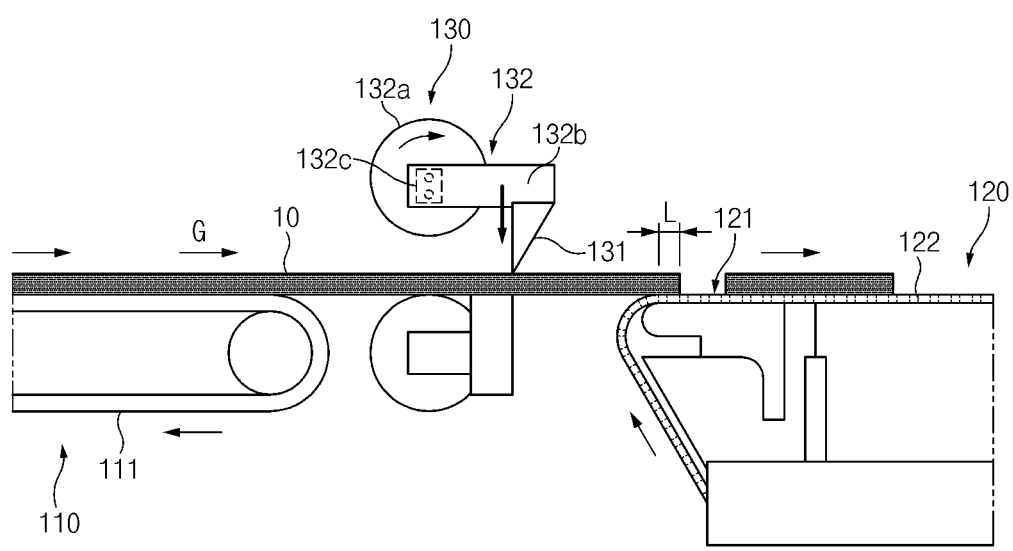
FIG. 3 is a front view illustrating a state in which the electrode is cut in the apparatus for manufacturing the electrode assembly according to an embodiment of the present invention.

FIG. 1 is a perspective view illustrating an apparatus for manufacturing an electrode assembly according to an embodiment of the present invention, FIG. 2 is a front view illustrating a state before an electrode is cut in the apparatus for manufacturing the electrode assembly according to an embodiment of the present invention, and FIG. 3 is a front view illustrating a state in which the electrode is cut in the apparatus for manufacturing the electrode assembly according to an embodiment of the present invention.

Referring to FIGS. 1 to 3, an apparatus 100 for manufacturing an electrode assembly according to an embodiment of the present invention comprises a cutting part 130 for cutting an electrode 10 to a predetermined size, a supply part 110 for moving and supplying the electrode 10 to the cutting part 130, and a moving part 120 for moving the electrode cut through the cutting part 130. Here, the moving part 120 may comprise a moving suction belt 121 for moving the electrode 10 and a moving means for moving the moving suction belt 121.

In more detail, the apparatus for manufacturing the electrode assembly according to an embodiment of the present invention is an apparatus for manufacturing an electrode assembly, in which the electrode and a separator are alternately stacked, by cutting and moving the electrode 10.

Here, the electrode assembly may be a power generation element that is chargeable and dischargeable and be accommodated in a battery case to manufacture a secondary battery.

The electrode 10 may comprise a positive electrode and a negative electrode. Also, each of the separators separates the positive electrode from the negative electrode to electrically insulate the positive electrode from the negative electrode.

The positive electrode may comprise a positive electrode collector and a positive electrode active material applied to the positive electrode collector. For example, the positive electrode collector may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The negative electrode may comprise a negative electrode collector and a negative electrode active material applied to the negative electrode collector. For example, the negative electrode collector may be provided as foil made of a copper (Cu) or nickel (Ni) material. The negative electrode active material may comprise synthetic graphite, lithium a metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

The separators may be alternately stacked with respect to the positive electrode and the negative electrode, each of which is made of an insulation material. Each of the separator 114 may be, for example, a multi-layered film produced by microporous polyethylene, polypropylene, or a combination thereof or a polymer film for solid polymer electrolytes or gel-type polymer electrolytes such as polyvinylidene fluoride, polyethylene oxide, polyacrylonitrile, or polyvinylidene fluoride hexafluoropropylene copolymers.

Figure 4:
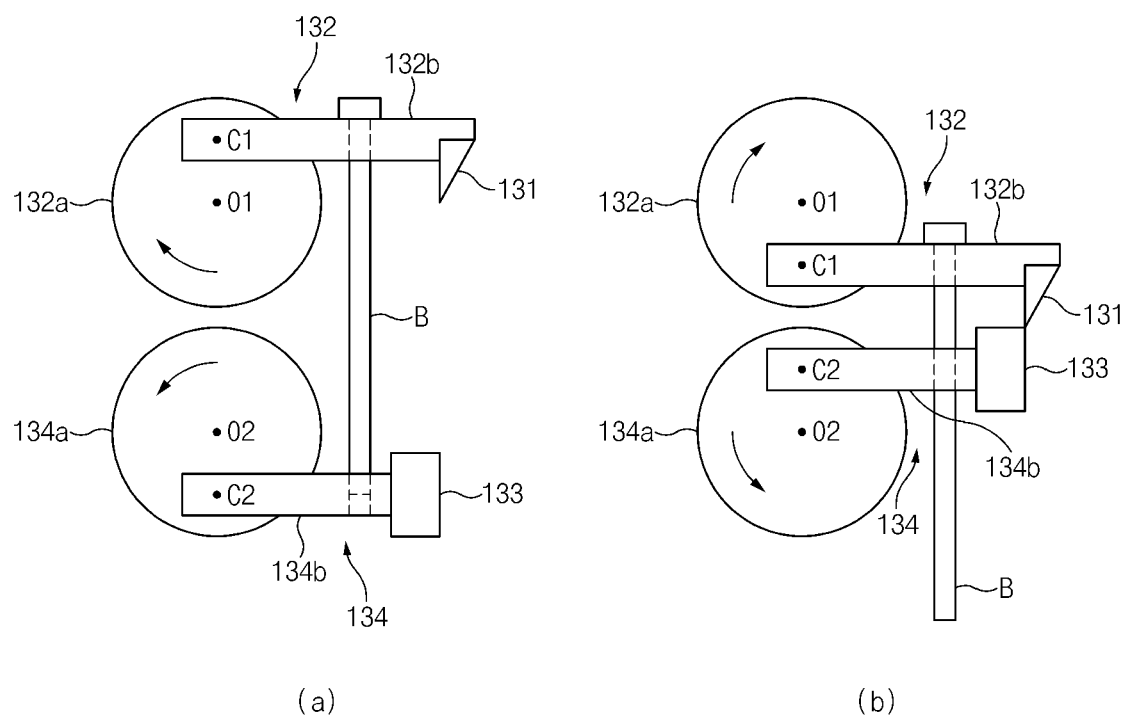
FIG. 4 is a front view illustrating a state in which the electrode is cut in the apparatus for manufacturing the electrode assembly according to an embodiment of the present invention.

FIG. 4 is a schematic front view illustrating a concept of a cutting part in the apparatus for manufacturing the electrode assembly according to an embodiment of the present invention.

Referring to FIGS. 2 to 4, the cutting part 130 may cut the electrode 10 to a predetermined size.

Also, the cutting part 130 may comprise a cutting blade 131 for cutting the electrode 10 and an eccentric cam part 132 for driving the cutting blade 131.

Thus, a speed at which the electrode 10 is cut may be synchronized through rotation of the eccentric cam part 132.

That is, in the related art, when the cutting blade 131 is vertically moved to an actuator, stop and operation sections occur, and when the electrode 10 is cut, the stop section occurs. However, according to the present invention, the cutting blade 131 may be moved through the rotation of the eccentric cam part 132 to remove the stop section, thereby synchronizing the cutting speed.

The eccentric cam part 132 may comprise a rotating part 132a, a mounting plate 132b on which the cutting blade 131 is mounted, and an eccentric cam 132c that eccentrically couples the rotating part 132a to the mounting plate 132b.

Referring to FIG. 4, when the concept of the cutting part 130 is illustrated as an example, the eccentric cam parts 132 and 134 above and below the electrode are rotated, and the cutting blade 131 and an eccentric part in the form of a cutting block 134 are moved in a direction in which the cutting blade 131 and the cutting block 134 face each other or and a direction in which the cutting blade 131 and the cutting block 134 are away from each other.

The cutting block 134 disposed below the electrode 10 may comprise a rotating part 134a and a mounting plate 134b on which the cutting block 134 is mounted.

The rotating parts 132a and 134a of the eccentric cam parts 132 and 134 disposed above and below the electrode may be rotated around center axes O1 and O2, and the mounting plates 132b and 134b may be rotatably eccentrically coupled to the eccentric portions C1 and C2 that are eccentric to the rotating parts 132a and 134a.

Here, a through-hole is formed in each of the mounting plates 132b and 134b of the eccentric cam parts 132 and 134, which are disposed vertically, so that a guide rod B is coupled.

Here, the mounting plates 132b and 134b of the eccentric cam parts 132 and 134 that are disposed vertically may be moved by guide of the guide rod B so that an end of the cutting blade 131 is maintained to face a downward side.

Referring to FIGS. 1 to 3, the supply part 110 may be disposed in front of the cutting part 130 with respect to a traveling direction G of the electrode 10 to move and supply the electrode 10 to the cutting part 130.

Also, the supply part 110 may comprise a conveyor belt 111 to move the electrode 10.

The moving part 120 may be disposed behind the cutting part 130 with respect to the traveling direction G of the electrode 10 to move the electrode 10 cut through the cutting part 130.

Also, the moving part 120 may comprise a moving suction belt 121 that vacuum-suctions and moves the electrode 10. When the electrode 10 is moved, the electrode 10 may be fixed to the moving suction belt 121 to prevent the electrode 10 from being twisted.

The moving suction belt 121 may fix an end of the electrode 10 when cutting the electrode 10 in the cutting part 130. Thus, when the electrode 10 is cut, the electrode may be fixed to prevent the electrode 10 from being twisted.

Here, when the electrode 10 is cut in the cutting part 130, the moving suction belt 121 may adsorb and fix the electrode 10 by a length L of 10 mm or more in the traveling direction G of the electrode 10. Here, the cutting part 130 may cut the electrode 10 to a certain length in the traveling direction G of the electrode 10, but may adsorb and fix a portion of the electrode 10 having a length less than the certain length of the electrode 10 to be cut.

Also, the moving suction belt 121 may comprise a vacuum suction part 122 that vacuum-suctions the electrode 10.

The vacuum suction part 122 may form a plurality of suction holes to suction air through the suction holes, thereby vacuum-adsorbing and fixing the electrode 10 seated on upper ends of the suction holes. Here, each of the suction holes may be formed in a circular shape.

Here, a device configured to provide suction force for suctioning air through the suction hole is a known technique, and thus a detailed description thereof will be omitted.

The moving means 125 may provide moving force for moving the moving suction belt 121.

Also, the moving means 125 may comprise a moving pulley part 123 on which the moving suction belt 121 is mounted on an outer circumferential surface and a moving part motor 124 rotating the moving pulley part 123.

Here, when a rotation shaft of the moving part motor 124 is rotated to rotate the moving pulley part 123, the moving suction belt 121 mounted in close contact with the moving pulley part 123 may be moved.

As an example, when cutting the electrode 10 in the cutting part 130, the moving part 120 may maintain the tension of the electrode 10 through the moving suction belt 121.

As another example, when cutting the electrode 10 in the cutting part 130, the moving part 120 may improve the tension of the electrode 10 through the moving suction belt 121, and then the electrode 10 may be cut in the cutting part 130.

Thus, when cutting the electrode 10, the tension of the electrode 10 may be maintained or improved to more effectively prevent the electrode 10 from being twisted.

Another Embodiment

Hereinafter, an apparatus for manufacturing an electrode assembly according to another embodiment of the present invention will be described.

Figure 5:
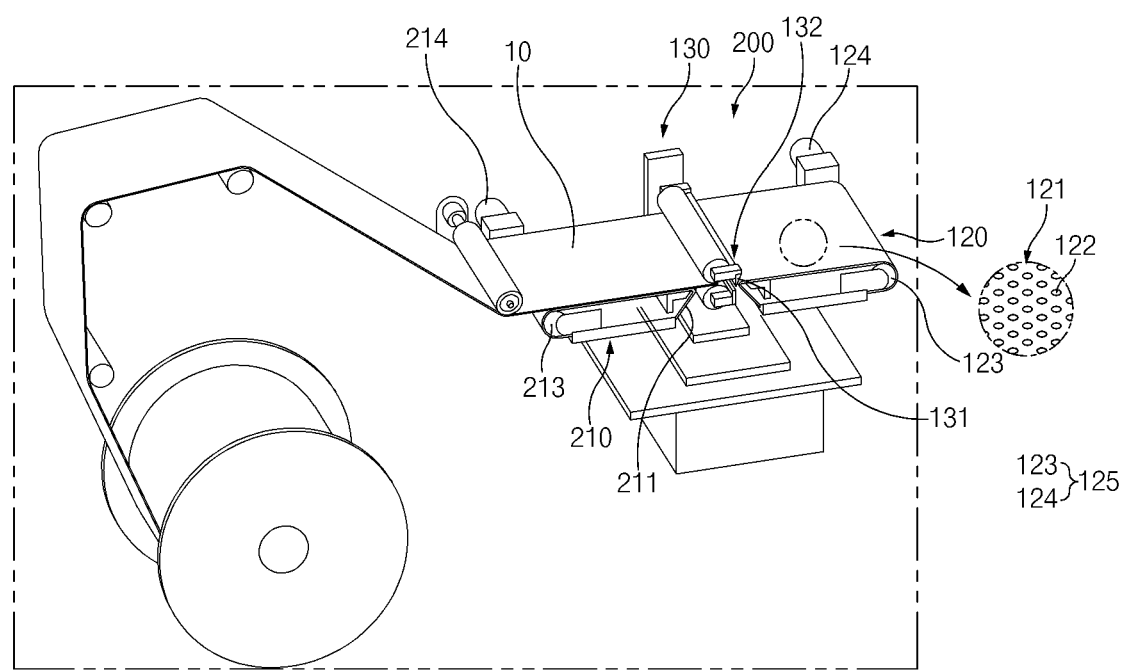
FIG. 5 is a perspective view illustrating a state in which an electrode is cut in an apparatus for manufacturing an electrode assembly according to another embodiment of the present invention.
Figure 7:
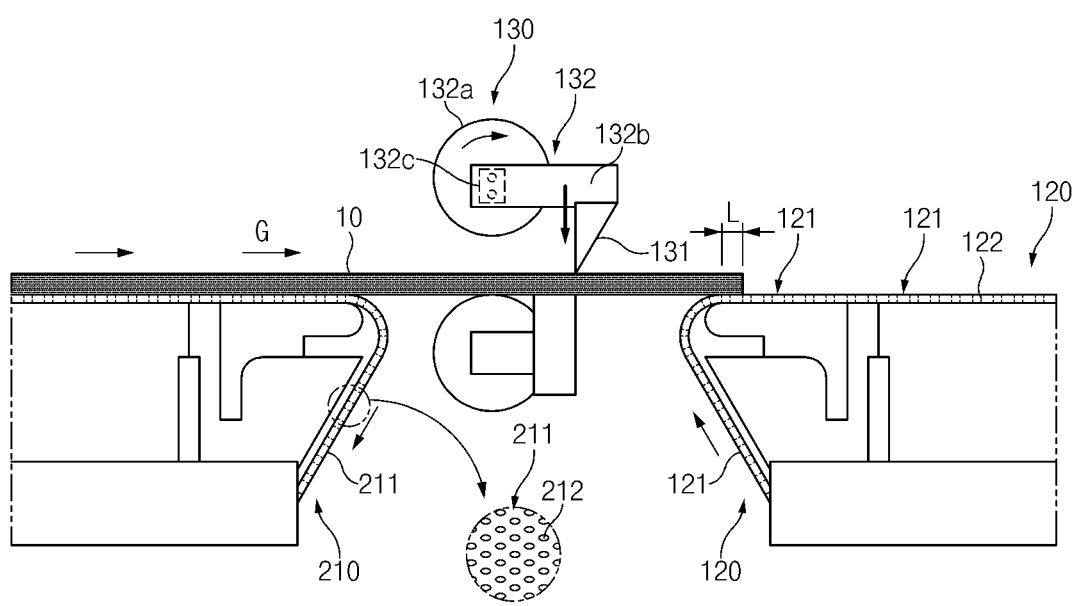
FIG. 7 is a front view illustrating a state in which an electrode is cut in an apparatus for manufacturing an electrode assembly according to another embodiment of the present invention.

FIG. 5 is a perspective view illustrating a state in which an electrode is cut in an apparatus for manufacturing an electrode assembly according to another embodiment of the present invention, FIG. 2 is a front view illustrating a state before an electrode is cut in the apparatus for manufacturing the electrode assembly according to an embodiment of the present invention, and FIG. 7 is a front view illustrating a state in which an electrode is cut in an apparatus for manufacturing an electrode assembly according to another embodiment of the present invention.

Figure 6:
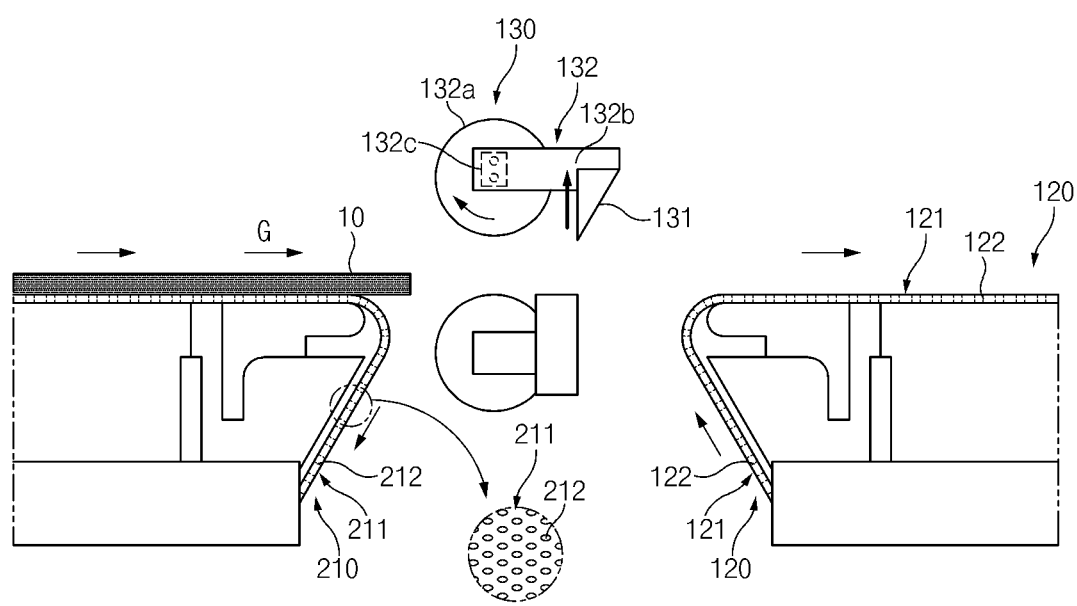
FIG. 6 is a front view illustrating a state before an electrode is cut in the apparatus for manufacturing the electrode assembly according to an embodiment of the present invention.

Referring to FIGS. 5 to 7, an apparatus 200 for manufacturing an electrode assembly according to another embodiment of the present invention comprises a cutting part 130 for cutting an electrode 10 to a predetermined size, a supply part 210 for moving and supplying the electrode 10 to the cutting part 130, and a moving part 120 for moving the electrode cut through the cutting part 130. Here, the moving part 120 may comprise a moving suction belt 121 for moving the electrode 10 and a moving means 125 for moving the moving suction belt 121.

When the apparatus 200 for manufacturing the electrode assembly according to another embodiment of the present invention is compared to the apparatus 100 for manufacturing the electrode assembly according to the foregoing embodiment of the present invention, this embodiment is different from the foregoing embodiment in configuration of the supply part 210. Thus, in the apparatus 200 for manufacturing the electrode assembly according to another embodiment of the present invention, contents duplicated with those of the apparatus for manufacturing the electrode assembly according to the foregoing embodiment and the apparatus for manufacturing the electrode assembly according to another embodiment will be omitted or briefly described, and also, only differences therebetween will be described.

In more detail, a cutting part may cut an electrode 10 to a predetermined size.

Also, the cutting part 130 may comprise a cutting blade 131 for cutting the electrode 10 and a cutting driving part 132 for vertically driving the cutting blade 131.

Thus, a speed at which the electrode 10 is cut may be synchronized through rotation of the eccentric cam part 132.

The supply part 210 may be disposed in front of the cutting part 130 with respect to a traveling direction G of the electrode 10 to move and supply the electrode 10 to the cutting part 130.

The supply part 210 may further comprise a supply suction belt 211 for vacuum-suctioning and moving the electrode 10 and a supply means for providing moving force for moving the supply suction belt 211.

The supply suction belt 211 may fix the electrode 10 when cutting the electrode 10 in the cutting part 130. Thus, when the electrode 10 is cut, the electrode 10 may be fixed to prevent the electrode 10 from being twisted.

The supply suction belt 211 may comprise a vacuum suction part 212 that vacuum-suctions the electrode 10. In FIG. 6 that illustrates a front view, a side view of a portion of the supply suction belt 211 is additionally illustrated for explaining the vacuum suction part 212.

The vacuum suction part 212 may form a plurality of suction holes to suction air through the suction holes, thereby vacuum-adsorbing and fixing the electrode 10 seated on upper ends of the suction holes.

Also, the supply means may comprise a supply pulley part 213 on which the supply suction belt 211 is mounted on an outer circumferential surface and a supply part motor 214 that rotates the supply pulley part 213.

Here, when a rotation shaft of the supply part motor 214 is rotated to rotate the supply pulley part 213, the supply suction belt 211 mounted in close contact with the supply pulley part 213 may be moved.

The moving part 120 may be disposed behind the cutting part 130 with respect to the traveling direction G of the electrode 10 to move the electrode 10 cut through the cutting part 130.

Also, the moving part 120 may comprise a moving suction belt 121 that vacuum-suctions and moves the electrode 10. Thus, when the electrode 10 is cut, the electrode 10 may be fixed to prevent the electrode 10 from being twisted. Here, when the electrode 10 is cut, the electrode 10 may be firmly fixed through the supply part 210 and the moving part 120 to effectively prevent the electrode 10 from being twisted.

The moving suction belt 121 may fix an end of the electrode 10 when cutting the electrode 10 in the cutting part 130.

Also, the moving suction belt may comprise a vacuum suction part 122 for vacuum-suctioning the electrode 10.

Furthermore, when cutting the electrode 10 in the cutting part 130, the moving suction belt 121 may adsorb and fix an electrode length L by a length of 10 mm or more in the traveling direction G of the electrode 10.

A moving speed of the supply suction belt 211 and a moving speed of the moving suction belt 121 may be different from each other.

Here, the moving speed of the moving suction belt 121 may be faster than the moving speed of the supply suction belt 211. Thus, a gap between the electrodes 10 may be formed.

Here, the moving speed of the supply suction belt 211 may be 500 mm/s, and the moving speed of the moving suction belt 121 may be 550 mm/s. Here, the electrodes 10 may be widened by a certain gap therebetween. (error (+,−) 0.15 mm)

Thus, the tension of the electrode 10 may be maximized to significantly improve cutting quality.

The moving means may provide moving force for moving the moving suction belt 121.

Also, the moving means may comprise a moving pulley part 123 on which the moving suction belt 121 is mounted on an outer circumferential surface and a moving part motor 124 rotating the moving pulley part 123.

As an example, when cutting the electrode 10 in the cutting part 130, the moving part 120 may maintain the tension of the electrode 10 through the moving suction belt 121.

As another example, when cutting the electrode 10 in the cutting part 130, the moving part 120 may improve the tension of the electrode 10 through the moving suction belt 121, and then the electrode 10 may be cut in the cutting part 130.

Thus, when cutting the electrode 10, the tension of the electrode 10 may be maintained or improved to more effectively prevent the electrode 10 from being twisted.

While the present invention has been particularly shown and described with reference to exemplary embodiments thereof, it is to be understood that the scope of the present invention is not limited to the apparatus for manufacturing the electrode assembly according to the present invention. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

10: Electrode
100, 200: Apparatus for manufacturing electrode assembly
110, 210: Supply part
111: Conveyor belt
120: Moving part
121: Moving suction belt
122: Vacuum suction part
123: Moving pulley part
124: Moving part motor
130: Cutting part
131: Cutting blade
132: Eccentric cam part
211: Supply suction belt
212: Vacuum suction part
213: Supply pulley part
214: Supply part motor
G: Traveling direction

The invention claimed is:

1. An apparatus for manufacturing an electrode assembly, the apparatus comprising:
a cutting part configured to cut an electrode to a predetermined size;
a supply part disposed in front of the cutting part with respect to a traveling direction of the electrode to move and supply the electrode to the cutting part; and
a moving part disposed behind the cutting part with respect to the traveling direction of the electrode to move the electrode cut through the cutting part,
wherein the moving part comprises a moving suction belt configured to vacuum-suction and move the electrode,
wherein the moving suction belt fixes an end of the electrode when the electrode is cut in the cutting part,
wherein, when the electrode is cut in the cutting part, the moving part maintains tension of the electrode in the traveling direction of the electrode through the moving suction belt,
wherein the supply part and the moving part are separated by a gap,
wherein the cutting part is interposed between the supply part and the moving part in the gap,
wherein the cutting part is configured to cut the electrode while the electrode is vacuum-suctioned by the moving part and being extended from the moving part to the supply part,
wherein the cutting part further comprises:
a cutting blade configured to cut the electrode;
a first eccentric cam part disposed above the electrode when the electrode is cut, the first eccentric cam part being configured to drive the cutting blade, the first eccentric cam part including a first rotating part configured to rotate about a center axis, a first mounting plate on which the cutting blade is mounted, and a first eccentric cam that eccentrically couples the first rotating part to the first mounting plate, a cutting block to engage the cutting blade, and a second eccentric cam part disposed below the electrode when the electrode is cut, the second eccentric cam part including a second rotating part configured to rotate about a center axis, a second mounting plate eccentrically coupled to the first rotating part of the first eccentric cam part, and the cutting block mounted on the second mounting plate, wherein rotations of the first rotating part and the second rotating part are synchronized so that the cutting blade and the cutting block approach each other or move away from each other in synchronization, wherein each of the first mounting plate and the second mounting plate includes a through-hole, and wherein a guide rod is coupled to the first mounting plate and the second mounting plate and positioned through each through-hole of the first mounting plate and the second mounting plate and movements of the first mounting plate and the second mounting plate are guided by the guide rod during rotations of the first rotating part and the second rotating part.

2. The apparatus of claim 1, wherein, when the electrode is cut in the cutting part, the moving suction belt adsorbs and fixes the electrode by a length of 10 mm or more in the traveling direction of the electrode.

3. The apparatus of claim 1, wherein after the moving part maintains the tension of the electrode through the moving suction belt, the electrode being cut in the cutting part.

4. The apparatus of claim 1,
wherein a speed at which the electrode is cut is synchronized through rotations of the first eccentric cam part and the second eccentric cam part.

5. An electrode assembly manufactured through the apparatus for manufacturing the electrode assembly of claim 1.

6. A secondary battery comprising the electrode assembly manufactured through the apparatus for manufacturing the electrode assembly of claim 1.

7. The apparatus of claim 1, wherein the moving suction belt comprises a vacuum suction part configured to vacuum-suction the electrode.

8. The apparatus of claim 7, wherein the moving part further comprises a moving means configured to provide moving force for moving the moving suction belt, wherein the moving means comprises:

a moving pulley part on which the moving suction belt is mounted on an outer circumferential surface of the moving pulley part; and a moving part motor configured to rotate the moving pulley part.

9. The apparatus of claim 1, wherein the supply part further comprises a supply suction belt configured to vacuum-suction and move the electrode.

10. The apparatus of claim 9, wherein the supply suction belt fixes the electrode when the electrode is cut in the cutting part.

11. The apparatus of claim 9, wherein a moving speed of the supply suction belt and a moving speed of the moving suction belt are different from each other.

12. The apparatus of claim 11, wherein the moving speed of the moving suction belt is faster than the moving speed of the supply suction belt.

* * * * *